United States Patent
Hatano et al.

(10) Patent No.: US 7,438,837 B2
(45) Date of Patent: Oct. 21, 2008

(54) METHOD OF PRODUCING SOLID ELECTROLYTE AND SOLID ELECTROLYTE

(75) Inventors: Masaharu Hatano, Yokohama (JP); Mitsugu Yamanaka, Yokohama (JP); Makoto Uchiyama, Miura (JP); Kenji Furuya, Yokohama (JP); Yoshio Akimune, Tsukuba (JP); Masaya Okamoto, Tsukuba (JP)

(73) Assignees: Nissan Motor Co., Ltd., Kanagawa-Ken (JP); National Institute of Advanced Industrial Science and Technology, Tokyo (JP)

( * ) Notice: Subject to any disclaimer, the term of this patent is extended or adjusted under 35 U.S.C. 154(b) by 231 days.

(21) Appl. No.: 10/549,290
(22) PCT Filed: Mar. 19, 2004
(86) PCT No.: PCT/JP2004/003774

§ 371 (c)(1),
(2), (4) Date: Sep. 16, 2005

(87) PCT Pub. No.: WO2004/083147

PCT Pub. Date: Sep. 30, 2004

(65) Prior Publication Data

US 2006/0172169 A1     Aug. 3, 2006

(30) Foreign Application Priority Data

Mar. 20, 2003   (JP)   ............................. 2003-078066

(51) Int. Cl.
C04B 35/48      (2006.01)
C04B 35/645     (2006.01)
H01B 1/08       (2006.01)
H01M 8/02       (2006.01)
B28B 1/00       (2006.01)

(52) U.S. Cl. .............. 252/520.2; 252/518.1; 252/519.1; 252/507; 252/182.1; 429/30; 429/33; 429/40; 429/46; 429/188; 429/304; 264/618; 264/667; 423/594.12; 501/103

(58) Field of Classification Search .............. 252/182.1, 252/518.1, 519.1; 429/30, 33, 46, 188, 304; 264/618; 501/103
See application file for complete search history.

(56) References Cited

U.S. PATENT DOCUMENTS 4,205,051 A   *   5/1980   Takahashi et al. ........... 423/266

(Continued)

FOREIGN PATENT DOCUMENTS

JP           56-109871         8/1981

(Continued)

OTHER PUBLICATIONS

Badal et al., "Scandia-Zirconia electrolytes for intermediate temperature solid oxide fuel cells," Solid State Ionics, 2000, 136-137, pp. 91-99.*

(Continued)

Primary Examiner—Stanley Silverman
Assistant Examiner—Kallambella Vijayakumar
(74) Attorney, Agent, or Firm—McDermott Will & Emery LLP (57) ABSTRACT

A method of producing a solid electrolyte (3, 13) is disclosed wherein solid electrolyte material is prepared having a composition expressed by a formula: $(1-x)\ ZrO_2\ \{xSc_2O_3$ (where x is a number equal to or greater than 0.05 and equal to or less than 0.15), and a spark plasma method is carried out to sinter solid electrolyte material, resulting in a solid electrolyte. Such spark plasma method is executed by applying first compression load, equal to or less that 40 MPa, to solid electrolyte material, to sinter the solid electrolyte material to obtain sintered material, which is then cooled by applying second compression load, less than first compression load, to the sintered material, resulting in a solid electrolyte.

10 Claims, 5 Drawing Sheets

U.S. PATENT DOCUMENTS

| | | | |
|---|---|---|---|
| 4,328,296 A * | 5/1982 | Tanaka et al. | 429/304 |
| 4,465,778 A * | 8/1984 | Brook et al. | 501/104 |
| 6,019,885 A * | 2/2000 | Mazanec et al. | 205/633 |
| 6,787,261 B2 * | 9/2004 | Ukai et al. | 429/33 |
| 7,235,325 B2 * | 6/2007 | Ukai et al. | 429/40 |

FOREIGN PATENT DOCUMENTS

| | | |
|---|---|---|
| JP | 05-225820 | 9/1993 |
| JP | 06-150943 | 5/1994 |
| JP | 07-073891 | 3/1995 |
| JP | 10-097860 | 4/1998 |
| JP | 10-251070 | 9/1998 |

OTHER PUBLICATIONS

Takeuchi et al, "Improvement of mechanical strength of 8 mol% yttria stabilized zirconia ceramics by spark-plasma sintering," J. Electrochemical Soc., 2002, 149, pp. 455-461, Abstract.*

Badwal et al.; "Scandia-zirconia Electrolytes for Intermediate Temperature Solid Oxide Fuel Cell Operation"; *Solid State Ionics*; c. 2000; pp. 91-99; vol. 136-137; North Holland Pub. Company, Amsterdam, NL.

Tannenberger et al.; "Étude d'Eléctrolytes Solides á Base d'Oxide de Zirconium pour Piles á Combustible"; Proc. Int'; pp. 19-26; c. 1965.

Tomonari et al.; "Improvement of Mechanical Strength of 8 mol% Yttria-Stabilized Zirconia Ceramics by Spark-Plasma Sintering": *Journal of the Electrochemical Society*; c. 2002; Data Accession No. 2002:316802; XP-002283582.

* cited by examiner

METHOD OF PRODUCING SOLID ELECTROLYTE AND SOLID ELECTROLYTE

RELATED APPLICATION

This application is the U.S. National Phase under 35 U.S.C. § 371 of International Application No. PCT/JP2004/003774, filed Mar. 19, 2004, which in turn claims the benefit of Japanese Application No. 2003-078066, filed Mar. 20, 2003, the disclosures of which Applications are incorporated by reference herein in their entirety.

TECHNICAL FIELD

The present invention relates to a method of producing a solid electrolyte and a solid electrolyte and, more particularly, to a method of producing a zirconia-based solid electrolyte, preferably suited for use in an oxygen sensor and a fuel cell, and a solid electrolyte.

BACKGROUND ART

Recently, considerable research and development work has been positively undertaken in progress on a solid electrolyte because the solid electrolyte has been considered to be of no fear in leakage of liquid and have specified ions that contribute to electric conductivity to be extremely effective as electronic material of a variety of devices such as cells and gas sensors.

Particularly, development work on a ceramic solid electrolyte fuel cell (SOFC) continues in progress, and a zirconia-based ceramic fuel cell with a capacity of several kW has achieved a record of operating performance for several thousand hours. Since the SOFC is operated at a high temperature (of >1000° C.) and hydrocarbon fuel can be reformed inside the fuel cell, a high combustion efficiency (of >60%) can be obtained.

In general, the SOFC is comprised of a solid electrolyte, an anode and a cathode and, in addition, an intermediate layer if desired. Such composition materials are required to be stable in oxidization/reduction atmosphere and to have suitable ionic conductivities. Such composition materials are also required to have their thermal expansion coefficients close to each other, and the anode and cathode are required to include porous bodies through which gas is permeable. Further, the composition materials of the cells are desired to be high in strength and toughness and low in costs and, further in view of stability in operation of the SOFC, to include material systems that are concurrently sintered to satisfy basic requirements for electric conductivity.

Now, material for the solid electrolyte includes stabilized $ZrO_2$ that forms a mainstream in use, and as stabilizer, it has been usual practice to use oxides of alkaline earth metals, such as CaO, MgO, and rare earth oxides such as $Sc_2O_3$, $Y_2O_3$.

Here, $ZrO_2$ doped with alkaline earth metal of CaO exhibits an ionic conducting characteristic value of 0.01 (S/cm) at 800° C. Further, it has been reported that the ionic conductivity of $ZrO_2$ doped with one of rare earth oxides, such as $Y_2O_3$, $Yb_2O_3$ and $Gd_2O_3$, lies in a range of from $1\times10^{-1}$ to $1\times10^{-2}$ (S/cm) at 800° C. and decreases to a value less than $2\times10^{-2}$ (S/cm) when temperature drops below 650° C. (see H. TANNENBERGER et al., Proc. Int' I Etude Piles Combust, 19-26 (1965)). Research and development work for stabilized zirconia doped with one of such rare earth oxides has been mainly started by 1970.

Additionally, as systems which are added with more than two kinds of rare earth oxides, a combination of two kinds of materials, selected from three moles of $Y_2O_3$—$Yb_2O_3$—$La_2O_3$, and three moles of $Gd_2O_3$—$Yb_2O_3$ have been reported (see Japanese Patent Application Laid-Open Publication No. 06-116026). However, a characteristic value of such systems is not so high as 0.005 (S/cm) at 1000° C.

Recently, zirconia stabilized with scandium oxide has been disclosed as a solid electrolyte for a fuel cell operable at a temperature higher than 700° C. (see Japanese Patent Application Laid-Open Publication No. 06-150943 and Japanese Patent Application Laid-Open Publication No. 10-097860). However, since the strength of zirconia material sharply drops at a temperature in the vicinity of 600° C., development work has been undertaken mainly for technique of adding element, such as $Al_2O_3$, to the base material.

Now, in a solid electrolyte cell, power output of a unit cell is typically limited to a value of approximately 1.1 volts, and in order to obtain high power output, the solid electrolyte cell is required to take a laminated structure or a parallel structure. However, a ceramic cell with such a structure becomes large in size, making it extremely hard to select a particular system of ceramic materials while causing a difficulty in establishing technology to manufacture a large-sized fuel cell. To address such an issue, a container of a combustor body of such a large-sized ceramic fuel cell is required to effectively utilize a metallic component part, such as stainless steel of ferrite system. In order to effectively utilize such metal, the fuel cell needs to use solid electrolyte materials which are active throughout a wide temperature range, especially even at low temperatures (in a range of from 600° C. to 800° C.) so as to have an ionic conductivity equivalent to that resulting at the high temperature (of >1000° C.).

Further, the solid electrolyte has crystal that tends to break at temperatures around 650° C. Accordingly, when applied to the oxygen sensor, no need arises so far to take influence of a grain boundary phase occurring at the temperature, range described above and influence as a result of aging seriously. In contrast, when applied to the fuel cell, it has been strongly required to establish technology for stabilizing a crystal phase of the solid electrolyte at such a temperature range or at a further increased temperature range and to prevent the solid electrolyte from deterioration in strength at such high temperatures under the oxidation/reduction atmosphere. In this regard, a method of adding $Al_2O_3$ for stabilizing a crystal structure is disclosed (see Japanese Patent Application Laid-Open Publication No. 05-225820).

Furthermore, with respect to a method of manufacturing ceramic material, it has been proposed to provide a sintering method using a spark plasma-sintering machine (see Japanese Patent Publication No. 3007929 and its corresponding Japanese Patent Application Laid-Open Publication No. 10-251070).

DISCLOSURE OF INVENTION

However, upon studies conducted by the present inventors, it has been observed that when added with $Sc_2O_3$ in an amount equal to or greater than 6 mol % and equal to or less than 9 mol %, $Sc_2O_3$ stabilized zirconia has a crystal phase like a structure which includes cubic crystals and monoclinic crystals with an ionic conductivity which is evaluated to fall in the same level as that of rare earth oxide stabilized zirconia. When added with $Sc_2O_3$ in an amount equal to or greater than 10 mol %, $Sc_2O_3$ stabilized zirconia exhibits an ionic conductivity with a value several times higher than that of rare earth oxide stabilized zirconia at temperatures higher than 700° C.

In contrast, at temperatures equal to or greater than 500° C. and equal to or less than 700° C., a crystal phase (also referred to as a β-phase in the present specification) that is represented as $Zr_7Sc_2O_{17}$ resulting from phase change is exhibited, and a situation is also observed in that the ionic conductivity drops by two orders from that of the rare earth oxide stabilized zirconia.

Figure 3:
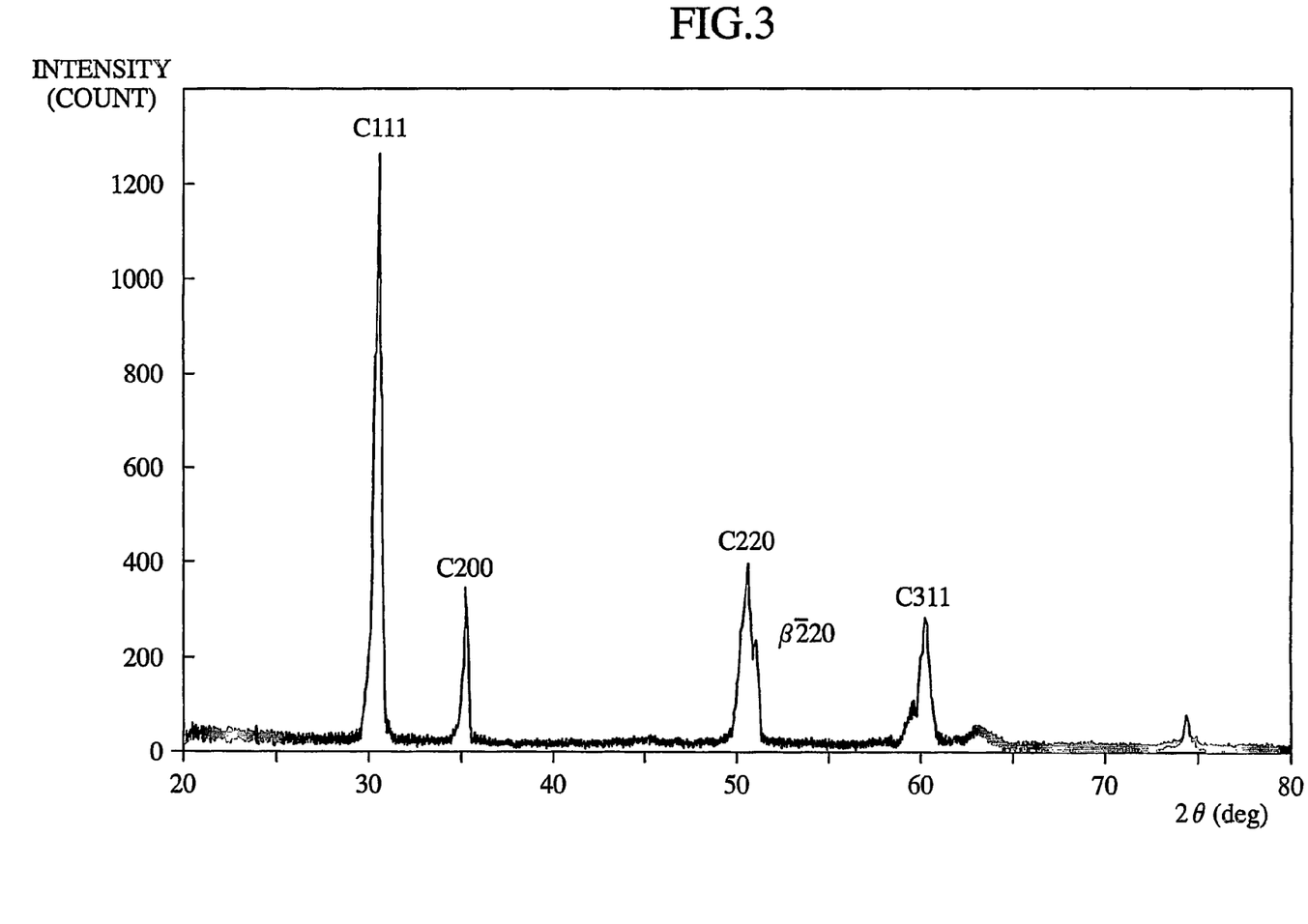
FIG. 3 is a view showing a chart of a result of spectrum measurement of the X-ray diffraction that has been studied by the present inventors.
Figure 4:
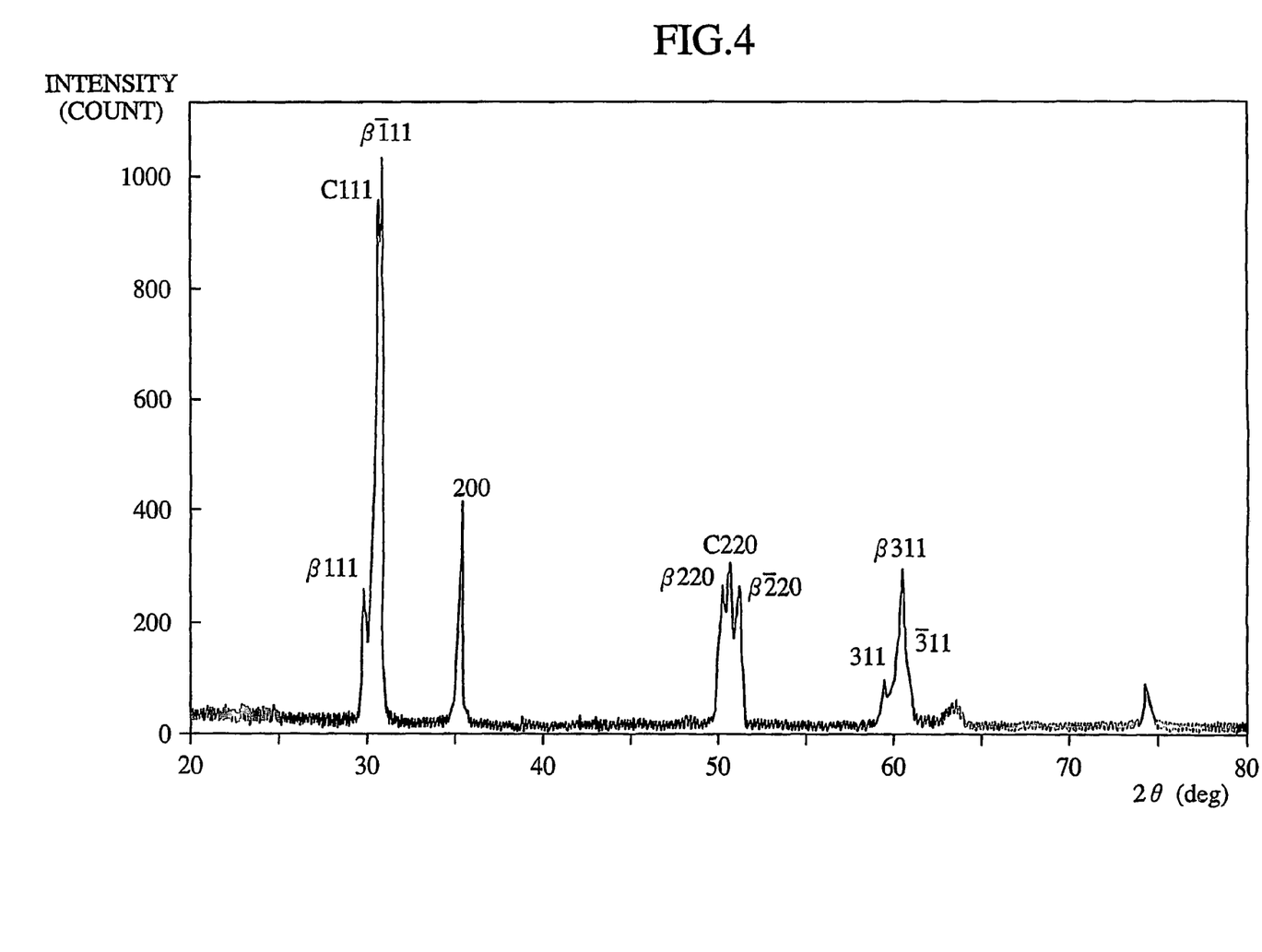
FIG. 4 is a view showing a chart of a result of composition measured by the X-ray diffraction that has been studied by the present inventors.

FIGS. 3 and 4 show results of diffraction spectra measured by an X-ray diffraction conducted for a solid electrolyte, with a composition represented by a formula: $(1-x) ZrO_2+xSc_2O_3$, to which studies of the present inventors have been conducted, and in each drawing figure, the abscissa indicates a diffraction angle of 2θ (degree) while the ordinate indicates a diffraction intensity (the number of counts). In these figures, such peaks of β $\overline{2}20$ and β 220 represent peaks of the β phase.

When applying such a solid electrolyte to an on-vehicle fuel cell in which reacting conditions vary, the fuel cell is considered to have a difficulty in use at the low temperature range and have adverse affects resulting from the occurrence of phase change accompanied with expansion and contraction.

Accordingly, in order to improve the ionic conductivity of $Sc_2O_3$ stabilized zirconia at the low temperature range, it is quite important for the crystal phase to be stabilized at the so-called high temperature range in a way not to exhibit the β-phase, that is, to prevent rapid change in conductivity accompanied with phase change occurring at the temperature range equal to or greater than 400° C. and equal to or less than 900° C. In order to stabilize a high temperature phase, a method of maintaining a crystallite diameter (size) at a small size is considered to be effective, and the status quo is that strong requirement exists for developing a method of minimizing the crystallites, especially, technique for sintering the solid electrolyte in a way in which no crystal growth occurs. Moreover, it is thought that not only the temperature rising condition but also the temperature drop condition are required to be studied and, simultaneously, technique for varying the temperature drop speed in a wide range also needs to be developed.

The present invention has been completed upon careful studies conducted by the present inventors as mentioned above and has an object to provide a method of producing a solid electrolyte, which has a high ionic conductivity in a wide temperature range, especially, even at a low temperature while even in the presence of variations in reacting temperature conditions, the occurrence of a phase change can be avoided to provide an excellent stability in a crystal structure and that is available to be used as an oxygen sensor and a fuel cell, and a solid electrolyte produced thereby.

According to one aspect of the present invention, a method of producing a solid electrolyte comprises: preparing solid electrolyte material with a composition formula: $(1-x) ZrO_2+xSc_2O_3$ (where x is a number equal to or greater than 0.05 and equal to or less than 0.15); and sintering the solid electrolyte material to obtain a solid electrolyte using a spark plasma method, which is provided with: sintering the solid electrolyte material to obtain sintered material while applying first compression load to the solid electrolyte material at a level equal to or less than 40 MPa; and cooling the sintered material to obtain the solid electrolyte while applying second compression load, less than the first compression load, to the sintered material.

In the meanwhile, in another aspect of the present invention, a solid electrolyte is obtained by a spark plasma method and has a composition expressed by a formula: $(1-x) ZrO_2+ xSc_2O_3$ (where x is a number equal to or greater than 0.05 and equal to or less than 0.15) wherein suppose that an X-ray diffraction intensity is I, the solid electrolyte has a cubic crystal ratio, $[I (cubic crystal: 220)/\{I (cubic crystal: 220)+I (\beta\text{-phase}: 220)\}]\times 100$ (%), equal to or greater than 90%.

Other and further features, advantages, and benefits of the present invention will become more apparent from the following description taken in conjunction with the following drawings.

BEST MODE FOR CARRYING OUT THE INVENTION

Hereinafter, a method of producing a solid electrolyte of an embodiment according to the present invention and a solid electrolyte are described in detail with suitable reference to the accompanying drawings.

A method of producing a solid electrolyte of the presently filed embodiment includes a method of producing a solid electrolyte with a composition expressed by a formula: $(1-x) ZrO_2+xSc_2O_3$ (x is a number equal to or greater than 0.05 and equal to less than 0.15).

Here, solid solution added with rare earth oxides, such as $Sc_2O_3$, takes the form of a "fluorite" structure in which strains occur in a lattice depending on atomic radii of added elements and, so, an optimum amount of additive differs for each element to be added. Since the optimum amount of additive falls in a narrow range and, in the presence of compositions that are partially deviated as a result of thermal diffusion of added elements, characteristics of resulting compositions vary in a wide range, it is quite important for a crystal structure to be maintained in a stable condition so as to prevent the characteristic, such as an ionic conductivity, from being deteriorated.

With such a view in mind, it is important, in the first place, for the above formula to allow x to take a range equal to or greater than 0.05 and equal to or less than 0.15. If x is less than 0.05, monoclinic crystals increase to cause deterioration in the ionic conductivity and, in contrast, if x exceeds a value of 0.15, a β-phase precipitates with no stabilized phase taking place at the high temperature range.

Further, no particular limitation is intended in manufacturing steps of the method of producing the solid electrolyte of the presently filed embodiment provided that the solid electrolyte is enabled to obtain a suitable cubic crystal rate and, in particular, it is realistic for the production method to be to carried out through mixing step of source oxide materials, calcining and synthesizing step, pulverizing step, sintering step and molding step wherein, particularly, in sintering step among other steps, it is more effective to employ a spark-plasma method under a specified condition.

That is to say, by the present inventors, it has been found out that using the spark-plasma method to allow source materials to be sintered at a low temperature for a short period of time enables requisite time for producing a ceramic to be remarkably shortened and specifically a solid electrolyte with a high performance that is excellent in an ionic conductivity can be provided.

Here, by the spark-plasma method is meant the method of applying compression load to source powder material and also applying DC pulse currents to source powder material, and may also be referred to as electrical discharge sintering step or energizing sintering step. More particularly, source powder material is compressed into a green compact, which in turn is electrically conducted with ON/OFF pulsed currents with compression load or compression weighting being applied to the green compact, and regulating a peak current value and a current pulse width allows the material temperature to be controlled to achieve compression sintering.

Now, a sequence of steps forming the method of producing the solid electrolyte of the presently filed embodiment is described below in detail.

First, compound powder containing Zr as metallic element and compound powder containing Sc as alkaline rare earth element serving as stabilizer, are weighed such that the ratio of Sc in mixture varies in a range equal to or greater than 5 mol % and equal to or less than 15 mol %, and then mixed together to obtain compound containing Zr and Sc. Here, no specific technology is intended in use for weighing and mixing processes, and any related art technologies may be suitably employed for such purposes. Also, the form of compound containing Zr and Sc in this practice may preferably use the form of citric acid salt.

Next, with a view to oxidizing compound containing Zr and Sc in such a mixture for thereby synthesizing $ZrO_2$ and $Sc_2O_3$, the mixture is calcined under oxidizing circumstance such as atmosphere. When this takes place, the calcination temperature is set to fall in a range equal to or greater than 900° C. and equal to or less than 1000° C. At the calcination temperature below 900° C., no entire decomposition occurs in materials and, in contrast, at the calcination temperature above 1000° C., crystallites grow up to be excessively large in structure.

Subsequently, the resulting calcined product is pulverized in solvent, thereby obtaining slurry. At this time, a mean particle diameter of resulting pulverized mixture in slurry is preferable to be equal to or less than 0.5 μm for the following reasons. That is, if the mean particle diameter is greater than 0.5 μm, it becomes hard to carry out subsequent sintering step. The solvent to be used includes alcohol such as ethanol, methanol and water. Though pulverizing conditions may be suitably determined, pulverizing time may be suffice to fall in about 24 hours. Also, an apparatus for use in pulverizing is not particularly limited and to this end, a ball mill or vibration mill may be employed.

Then, the resulting slurry is thoroughly dried using a rotary evaporator or a spray drier.

Next, the resulting pulverized fine powder is sintered using the spark-plasma sintering method. Compression load, that is, pressure to be applied during such sintering step is preferably set to fall in a value equal to or less than 40 MPa. Although it is considered to be more preferable for compression load to be applied at such a high level because the larger the compression load, the higher will be the density of sintered material, it has been found that pressure to be applied has an upper limit when carrying out the spark plasma sintering method in which pulsed currents are applied. In particular, if compression load exceeds 40 MPa, even though sintering compactness is improved, a high probability exists wherein fine cracks occur inside the solid electrolyte after sintering with no exhibition of conducting characteristic. Therefore, when sintering is carried out using the spark plasma sintering method, compression load to be applied during such sintering step is preferably set to fall in a value equal to or less than 40 MPa. Also, if compression load to be applied during such sintering has a lower limit less than 20 MPa, in actual practice, no favorable sintering can be achieved and, so, the lower limit can be estimated to have a value equal to or greater than 20 MPa. Additionally, the sintering temperature preferably lies at a range equal to or greater than 1000° C. and equal to or less than 1150° C. and, more preferably, at the temperature of or around 1100° C. This is because that if the sintering temperature is below 1000° C., the sintered product has less density, and if the sintering temperature exceeds 1150° C., the grains become excessively large in size. Furthermore, sintering time is preferably set to a range equal to less than 180 minutes for the following reasons. That is, if sintering time exceeds 180 minutes, the grain size becomes excessively large. Also, sintering time has a lower limit that may possibly fall in a short period of time in the order of several seconds to several tens seconds provided that desired density is enhanced.

Further, during such sintering process, the temperature rising speed is set to a value equal to or greater than 250° C./minute for the following reasons. That is, if the temperature rising speed is less than 250° C./minute, materials react with a container, causing a fear of the solid electrolyte being contaminated with impurities after sintering.

Next, subsequent to sintering step, cooling step is executed. It doesn't matter if such cooling step and sintering step may be combined and referred to as sintering step.

During such cooling step, compression load is applied to sintered material at a value lower than compression load that is applied in preceding temperature rising process while the temperature drop speed is set to a value equal to or less than 200° C./minute for the following reasons. That is, permitting compression load, that is, pressure to be maintained in such a range enables sintering step to be performed while effectively alleviating distortion of the solid electrolyte, and if the temperature drop speed exceeds 200° C./minute, a probability exists in which cracks occurs in sintered material with no appearance of electrically conducting characteristic. Incidentally, even during such cooling step, sintered material is held in a sintering device, by which the spark plasma sintering method is applied, to apply electric current to sintered material, and compression load under which sintered material is held is preferably set to a range equal to or greater than 10 MPa and equal to or less than 15 MPa. The presence of such a pressure range is preferable in view of requirements in manufacturing process, in which electric current is applied, and resulting sintered material, that is, in view of a quality of crystallization in the solid electrolyte.

Subsequently, after sintering step involving such cooling step, heat treatment may be carried out in the atmosphere at a temperature range equal to or greater than 900° C. and equal to or less than 1000° C. for a time interval equal to or greater than five hours and equal to or less than fifteen hours for the following reason. That is, due to such heat treatment, a solid electrolyte with a further favorable characteristic can be obtained.

Here, the size of a crystal grain of sintered material, that is, the solid electrolyte as a result of sintering step has a mean grain diameter of a value equal to or less than 3 μm. The mean grain diameter was obtained by using an image device in which a mean value in length of the grain, on which an arbitrary number of, e.g., parallel ten straight lines cross, is read on a photograph taken by a scanning electron microscope (SEM). Thus, by adjusting the mean grain size to fall in the range equal to or less than 3 μm, the solid electrolyte which is dense and has high strength can be provided. Incidentally, a lower limit of the mean grain diameter may be sufficed to fall in size in which the crystallites are present.

Incidentally, it is, of course, possible to use the resulting sintered material, that is, the solid electrolyte, as a compact as it is, or to machine or mold into a formed body in a cylindrical shape after sintering whereupon the density of the formed body is measured while confirming the composition using an X-ray diffraction method.

Here, it is preferable for the resulting material, that is, the solid electrolyte to have the density of a value equal to or greater than 95% of a true density. This is due to the fact that no permeation of oxygen occurs.

Further, a cubic crystal rate of the resulting material, that is, the solid electrolyte, falls in a value equal to or greater than 90% because of the following reasons. That is, if the cubic crystalline rate of the value is less than 90%, the resulting material has a deteriorated electrical conductivity. Here, by the "cubic crystal rate" is meant the rate of a peak intensity (I), on a surface (220) on the X-ray diffraction, expressed in a percentage of (I (cubic crystal: 220)/{I (cubic crystal: 220)+I (β-phase: 220)}).

The solid electrolyte, resulting from steps set forth above, exhibits a stable crystal structure and ionic conductivity at wide temperature ranges and can be appropriately used for a fuel cell in which temperatures differ at various areas. Also, even when using such a solid electrolyte as an oxygen sensor to be installed on an exhaust pipe of an automobile where rapid change occurs in temperatures, the solid electrolyte is able to exhibit a stable characteristic.

Hereunder, the presently filed embodiment is described more in detail with reference to Examples 1 to 8 and Comparative Examples 1 to 7.

EXAMPLE 1

In this Example, first, scandium added zirconium (manufactured by Seimi Chemicals Co.) was provisionally sintered, thereby obtaining solid electrolyte material with a composition expressed by a general formula: $(1-x)\ ZrO_2+xSc_2O_3$ (x=0.06).

Next, the solid electrolyte material was calcined in the atmosphere at 1000° C. for two hours, and the resulting calcined product was pulverized in alcohol for approximately twenty four hours using a ball mill to obtain slurry whereupon the slurry was dried using a rotary evaporator.

Subsequently, fine powder as a result of pulverization was sintered using a spark-plasma sintering method. The spark plasma sintering was conducted under an evacuated condition with compression load of 35 MPa at a temperature of 1050° C. for sixty minutes at a holding electric current value of 1600 to 2200 A (which was regulated so as to maintain the temperature at 1050° C.). Prior to such holding step during sintering process, the temperature was elevated with the electric current of 2200 A during the temperature rise and at the temperature rising speed of 300° C./minute. Subsequent to step of holding the fine powder for sixty minutes, the cooling process was carried out with the compression load kept at 10 MPa at the temperature drop speed of 150° C./minute.

Additionally, after the sintering step described above, heat treatment was carried out on the resulting sintered body in the atmosphere at the temperature of 1000° C. for ten hours.

Also, the mean grain diameter of this sintered body was obtained from result of a photograph, which was taken using the scanning electron microscope (SEM) while the image device was used to read the mean value of the length of the grains which ten parallel straight lines cross. Also, the ionic conductivities of the sintered body were measured at the temperatures of 500° C. and 700° C., respectively.

Then, the resulting sintered body was machined into a cylindrical product, with a diameter of 6 mm and a height of 8 mm, whose density was measured, and the composition was measured using the X-ray diffraction.

As a result, the sample had the density of $5.5 \times 10^{-3}$ kg/m³. Also, the synthetic degree was judged in terms of a typical peak height (with respect to the crystallization rate of 100) on the X-ray diffraction and found that the sintered body was synthesized at a rate of 100%.

The above-described fabricating conditions associated with this Example and resulting measured values are indicated on Table 1, which will be described later.

EXAMPLES 2 TO 4

In Examples 2 to 4, respective sintered bodies were obtained in the same way as that of Example 1 except for that the spark plasma sintering steps in Example 1 were carried out on compositions, respectively, as represented in Table 1. Resulting sintered bodies were machined in the same way as that of Example 1, which were then subjected to measurements, and resulting values are indicated on Table 1, respectively, as described later.

Figure 1:
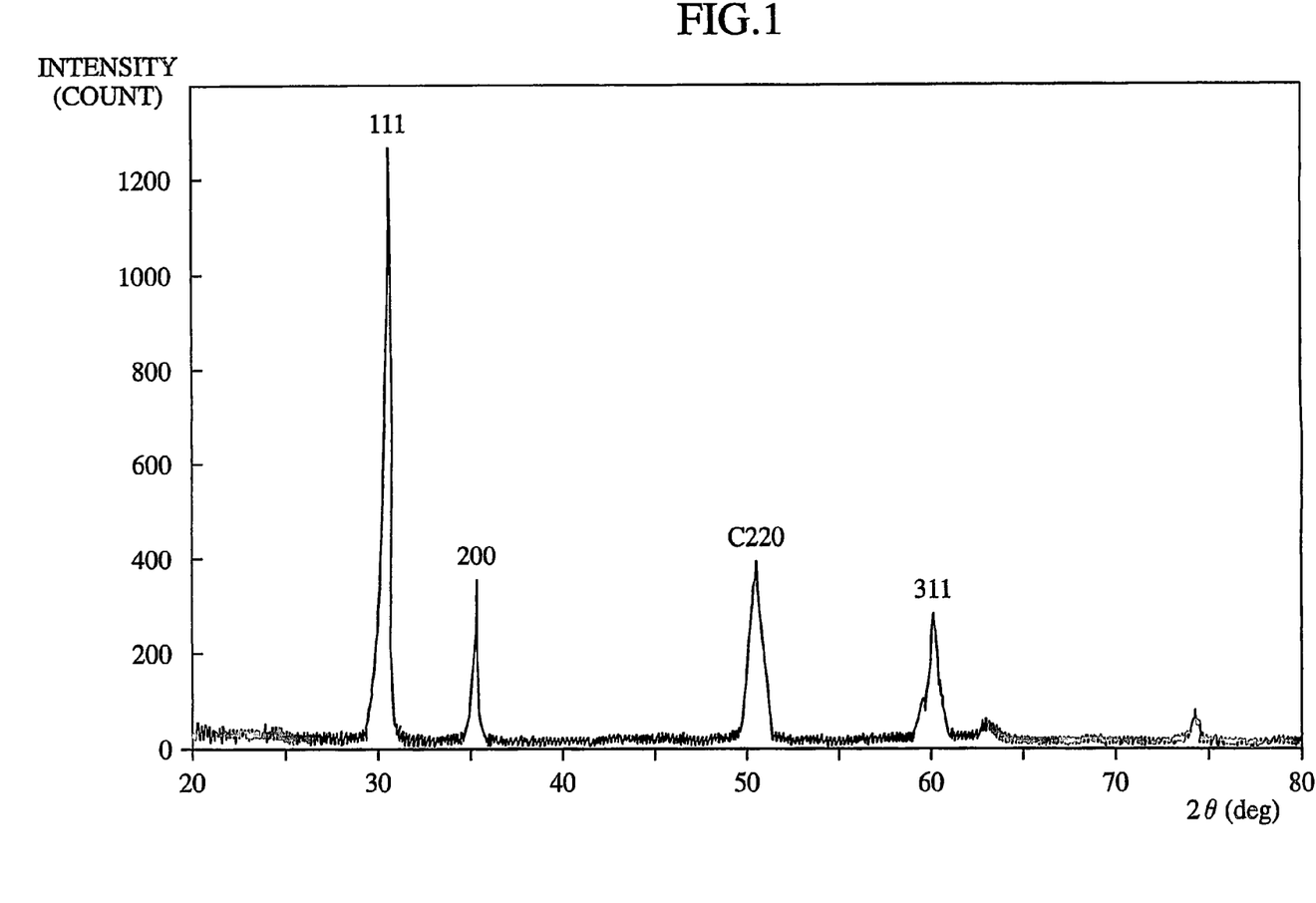
FIG. 1 is a view showing a chart of a result of spectrum measurement of an X-ray diffraction of Example 4 of the presently filed embodiment of the present invention.

Further, FIG. 1 illustrates the results of measurement in diffraction spectra resulting from the X-ray diffraction of Example 4, and the abscissa represents a diffraction angle of 2θ (degree) while the ordinate represents diffraction intensity (in the number of counts).

EXAMPLES 5 TO 8

In Examples 5 to 8, respective sintered bodies were obtained in the same way as that of Example 1 except for that the spark plasma sintering steps were carried out on compositions, sintering temperatures and sintering times, respectively, as represented in Table 2 that is described below. Resulting sintered bodies were machined in the same way as that of Example 1 whereupon measurements were conducted, and resulting values are indicated on Table 2, respectively, as described later.

COMPARATIVE EXAMPLES 1 TO 4

In Comparative Examples 1 to 3, with respect to Example 1, examples of the fine powder resulting from the pulverized materials that have compositions as shown in Table 3 described below were sintered in the atmosphere at the temperature 1500° C. for 300 minutes, thereby obtaining sintered bodies. In Comparative Example 4, in contrast to Comparative Example 3, sintering time was altered to 60 minutes, obtaining a sintered body. The resulting sintered bodies were cut in the same way as that of Example 1 to provide formed samples whereupon measurements were conducted, and the resulting values are indicated in Table 3 that will be described below.

Figure 2:
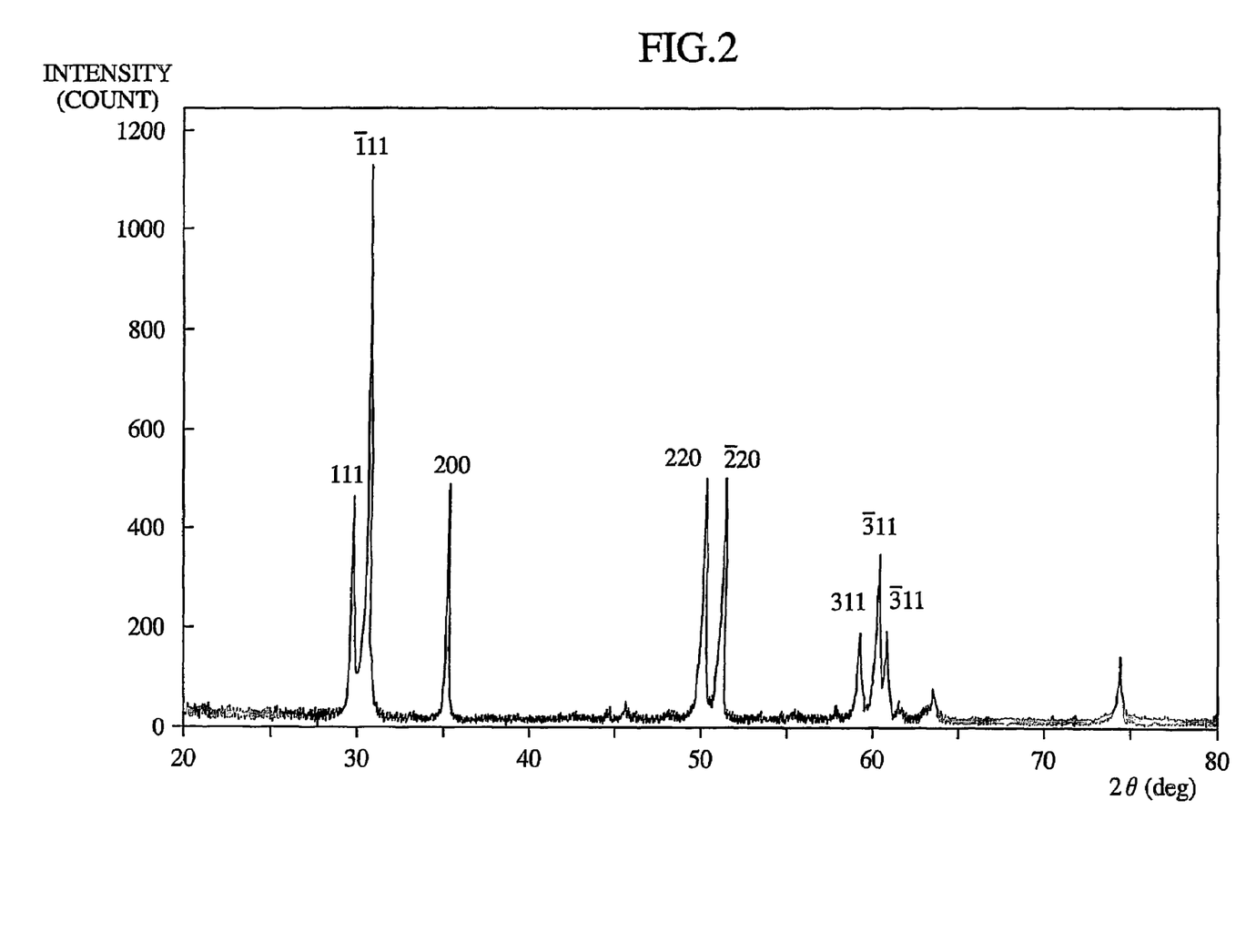
FIG. 2 is a view showing a chart of a result of spectrum measurement of the X-ray diffraction of Comparative Example 1 of the presently filed embodiment.

Further, the measured result on the diffraction spectrum resulting from the X-ray diffraction in Comparative Example 1 is indicated in FIG. 2, in which the abscissa represents the diffraction angle of 2θ (degree), and the ordinate represents diffraction intensity (in the number of counts).

COMPARATIVE EXAMPLES 5 TO 7

The sintered bodies in Comparative Examples 5 and 6 were obtained in the same way as that of Example 1 except for that the spark plasma sintering steps in Example 1 were carried out on compositions, sintering times, pressures at temperature rise and pressures at temperature drop, respectively, as represented in Table 4 that is described below, and the sintered body in Comparative Example 7 was obtained in the same way as that of Example 1 except for that the spark plasma sintering step was carried out on composition, sintering time and pressure at temperature rise as represented in Table 4 that is described below. Resulting sintered bodies were machined in the same way as that of Example 1, whereupon measurements were conducted, and obtained results are indicated on Table 4, respectively, which are described later.

Also, a judgment standard for evaluation to be "OK" or "NG" on overall-judgment in Tables 1 to 4 was employed in terms of the ionic conductivity such that the presence of the ionic conductivity falling in a range equal to or greater than 0.001 (S/cm) at 500° C. and equal to or less than 0.02 (S/cm) at 700° C. or in a range equal to or greater than 0.0015 (S/cm) only at 600° C. was regarded to be "OK" whereas if no such conditions were satisfied, the evaluation was regarded to be "NG". Also, with respect to the cubic crystal rate, the presence of a value greater than 90% was regarded to be "OK", and the absence of such a condition was regarded to be "NG".

TABLE 1

| | EXAMPLE 1 | EXAMPLE 2 | EXAMPLE 3 | EXAMPLE 4 |
|---|---|---|---|---|
| MATRIX $(1-x)ZrO_2 + xSc_2O_3$ | | | | |
| X | 0.06 | 0.08 | 0.1 | 0.12 |
| POWDER SYN COND | DECOMP OF CITRIC ACID SALT | DECOMP OF CITRIC ACID SALT | DECOMP OF CITRIC ACID SALT | DECOMP OF CITRIC ACID SALT |
| CALCINATION TEMP (° C.) | 1000 | 1000 | 1000 | 1000 |
| CALCINATION TIME (hr) | 2 | 2 | 2 | 2 |
| CALCINATION ATM | ATM | ATM | ATM | ATM |
| SINTERING METHOD, COND | SPARK PLASMA SINTERING | SPARK PLASMA SINTERING | SPARK PLASMA SINTERING | SPARK PLASMA SINTERING |
| SINTERING TEMP (° C.) | 1050 | 1050 | 1050 | 1050 |
| SINTERING TIME (min) | 60 | 60 | 60 | 60 |
| SINTERING ATM | VACUUM | VACUUM | VACUUM | VACUUM |
| CURRENT (A) AT TEMP RISE | 2200 | 2200 | 2200 | 2200 |
| HOLDING CURRENT (A) | 1600 to 2200 | 1600 to 2200 | 1600 to 2200 | 1600 to 2200 |
| TEMP RISING SPEED (° C./min) | 300 | 300 | 300 | 300 |
| PRESS. (MPa) AT TEMP RISE | 35 | 35 | 35 | 35 |
| TEMP DROP SPEED (° C./min) | 150 | 150 | 150 | 150 |
| PRESS. (MPa) AT TEMP DROP | 10 | 10 | 10 | 10 |
| HEAT TREATMENT TIME (hr) AT 1000° C. IN ATM | 10 | 10 | 10 | 10 |
| CHARACTERISTIC VALUES ION CONDUCTVITY (S/cm) | | | | |
| 500° C. | 0.001 | 0.0015 | 0.002 | 0.002 |
| 700° C. | 0.02 | 0.035 | 0.045 | 0.045 |
| DENSITY × $10^3$ (Kg/cm³) | 5.5 | | | |
| CRYSTAL GRAIN DIAMETER (μm) | 2 | 2 | 2 | 2 |
| CUBIC CRYSTAL RATIO (%) | 95 | 95 | 95 | 95 |
| JUDGEMENT | OK | OK | OK | OK |

TABLE 2

| | EXAMPLE 5 | EXAMPLE 6 | EXAMPLE 7 | EXAMPLE 8 |
|---|---|---|---|---|
| MATRIX $(1-x)ZrO_2 + xSc_2O_3$ | | | | |
| X | 0.12 | 0.12 | 0.12 | 0.12 |
| POWDER SYN COND | DECOMP OF CITRIC ACID SALT | DECOMP OF CITRIC ACID SALT | DECOMP OF CITRIC ACID SALT | DECOMP OF CITRIC ACID SALT |
| CALCINATION TEMP (° C.) | 1000 | 1000 | 1000 | 1000 |
| CALCINATION TIME (hr) | 2 | 2 | 2 | 2 |

TABLE 2-continued

|  | EXAMPLE 5 | EXAMPLE 6 | EXAMPLE 7 | EXAMPLE 8 |
| --- | --- | --- | --- | --- |
| CALCINATION ATM | ATM | ATM | ATM | ATM |
| SINTERING METHOD, COND | SPARK PLASMA SINTERING | SPARK PLASMA SINTERING | SPARK PLASMA SINTERING | SPARK PLASMA SINTERING |
| SINTERING TEMP (° C.) | 1150 | 1125 | 1075 | 1050 |
| SINTERING TIME (min) | 1 | 5 | 15 | 30 |
| SINTERING ATM | VACUUM | VACUUM | VACUUM | VACUUM |
| CURRENT (A) AT TEMP RISE | 2200 | 2200 | 2200 | 2200 |
| HOLDING CURRENT (A) | 1600 to 2200 | 1600 to 2200 | 1600 to 2200 | 1600 to 2200 |
| TEMP RISING SPEED (° C./min) | 300 | 300 | 300 | 300 |
| PRESS. (MPa) AT TEMP RISE | 35 | 35 | 35 | 35 |
| TEMP DROP SPEED (° C./min) | 150 | 150 | 150 | 150 |
| PRESS. (MPa) AT TEMP DROP | 10 | 10 | 10 | 10 |
| HEAT TREAT TIME (hr) AT 1000° C. IN ATM | 10 | 10 | 10 | 10 |
| CHARACTERISTIC VALUES | | | | |
| ION CONDUCTIVITY (S/cm) | | | | |
| 600° C. | 0.0018 | 0.0017 | 0.0016 | 0.0016 |
| DENSITY × $10^3$ (Kg/cm$^3$) | 5.5 | 5.52 | 5.54 | 5.55 |
| CRYSTAL GRAIN DIAMETER (μm) | 2 | 2 | 2 | 2 |
| CUBIC CRYSTAL RATIO (%) | 95 | 95 | 95 | 95 |
| JUDGEMENT | OK | OK | OK | OK |

TABLE 3

|  | COMPARATIVE EXAMPLE 1 | COMPARATIVE EXAMPLE 2 | COMPARATIVE EXAMPLE 3 | COMPARATIVE EXAMPLE 4 |
| --- | --- | --- | --- | --- |
| MATRIX $(1 - x)ZrO_2 + xSc_2O_3$ | | | | |
| x | 0.1 | 0.1 | 0.12 | 0.12 |
| POWDER SYN COND | DECOMP OF CITRIC ACID SALT | DECOMP OF CITRIC ACID SALT | DECOMP OF CITRIC ACID SALT | DECOMP OF CITRIC ACID SALT |
| CALCINATION TEMP (° C.) | 1000 | 1000 | 1000 | 1000 |
| CALCINATION TIME (hr) | 2 | 2 | 2 | 2 |
| CALCINATION ATM | ATM | ATM | ATM | ATM |
| SINTERING METHOD, COND | SINTERING IN ATM | SINTERING IN ATM | SINTERING IN ATM | SINTERING IN ATM |
| SINTERING TEMP (° C.) | 1500 | 1500 | 1500 | 1500 |
| SINTERING TIME (min) | 300 | 300 | 300 | 60 |
| SINTERING ATM | ATM | ATM | ATM | ATM |
| CHARACTERISTIC VALUES | | | | |
| ION CONDUCTIVITY (S/cm) | | | | |
| 500° C. | 0.00003 | 0.0005 | | |
| 600° C. | | | 0.0004 | 0.0003 |
| 700° C. | 0.035 | 0.028 | | |
| DENSITY × $10^3$ (Kg/cm$^3$) | | | 5.55 | 5.55 |
| CRYSTAL GRAIN DIAMETER (μm) | 5 | 8 | 8 | 5 |
| CUBIC CRYSTAL RATIO (%) | <10 | <10 | <10 | <10 |
| JUDGEMENT | NG | NG | NG | NG |

TABLE 4

|  | COMPARATIVE EXAMPLE 5 | COMPARATIVE EXAMPLE 6 | COMPARATIVE EXAMPLE 7 |
|---|---|---|---|
| MATRIX $(1 - x)ZrO_2 + xSc_2O_3$ | | | |
| X | 0.1 | 0.1 | 0.1 |
| POWDER SYN COND | DECOMP OF CITRIC ACID SALT | DECOMP OF CITRIC ACID SALT | DECOMP OF CITRIC ACID SALT |
| CALCINATION TEMP (° C.) | 1000 | 1000 | 1000 |
| CALCINATION TIME (hr) | 2 | 2 | 2 |
| CALCINATION ATM | ATM | ATM | ATM |
| SINTERING METHOD, COND | SPARK PLASMA SINTERING | SPARK PLASMA SINTERING | SPARK PLASMA SINTERING |
| SINTERING TEMP (° C.) | 1050 | 1050 | 1050 |
| SINTERING TIME (min) | 5 | 5 | 200 |
| SINTERING ATM | VACUUM | VACUUM | VACUUM |
| CURRENT (A) AT TEMP RISE | 2200 | 2200 | 2200 |
| HOLDING CURRENT (A) | 1600 to 2200 | 1600 to 2200 | 1600 to 2200 |
| TEMP RISING SPEED (° C./min) | 300 | 300 | 300 |
| PRESS. (MPa) AT TEMP RISE | 45 | 50 | 45 |
| TEMP DROP SPEED (° C./min) | 150 | 150 | 150 |
| PRES. (MPa) AT TEMP DROP | 35 | 35 | 10 |
| HEAT TREATMENT TIME (hr) AT 1000° C. IN ATM | 10 | 10 | 10 |
| CHARACTERISTIC VALUES | | | |
| ION CONDUCTIVITY (S/cm) | | | |
| 500° C. | 0.0005 | 0.0005 | |
| 600° C. | | | 0.0001 |
| 700° C. | 0.03 | 0.026 | |
| DENSITY × $10^3$ (Kg/cm$^3$) | | | 5.5 |
| CRYSTAL GRAIN DIAMETER (μm) | 3 | 6 | 3 |
| CUBIC CRYSTAL RATIO (%) | 70 | 50 | 70 |
| JUDGEMENT | NG | NG | NG |

As apparent from Tables 1 to 4, the producing method of the present invention represented by the presently filed embodiment makes it possible to obtain a solid electrolyte formed in a uniform crystal structure with a minimized mean grain diameter, which is excellent in an ionic conductivity, especially in an oxygen ion conductivity.

Further, as shown in FIG. 1, only C220 indicative of a peak of a cubic crystal is substantially observed in the X-ray diffraction spectrum on a plane (220), and the cubic crystal ratio is evaluated to reach a value of 100. Also, in FIG. 2, no peak of cubic crystal is observed.

Figure 5:
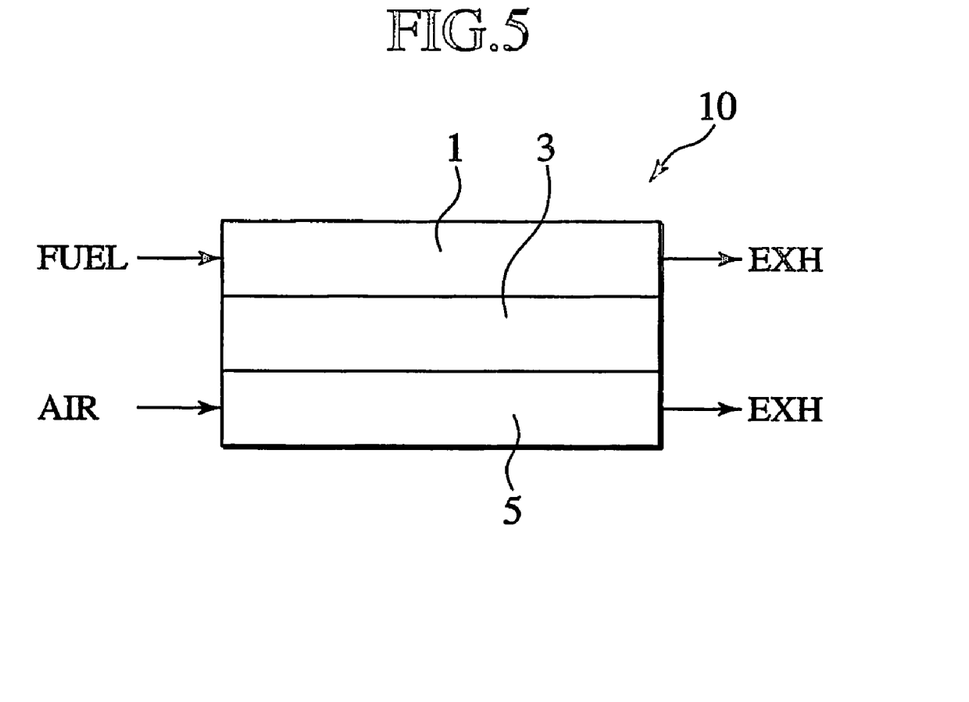
FIG. 5 is a view illustrating a schematic structure of a fuel cell (a unit cell) to which a solid electrolyte of the present invention can be applied.
Figure 6:
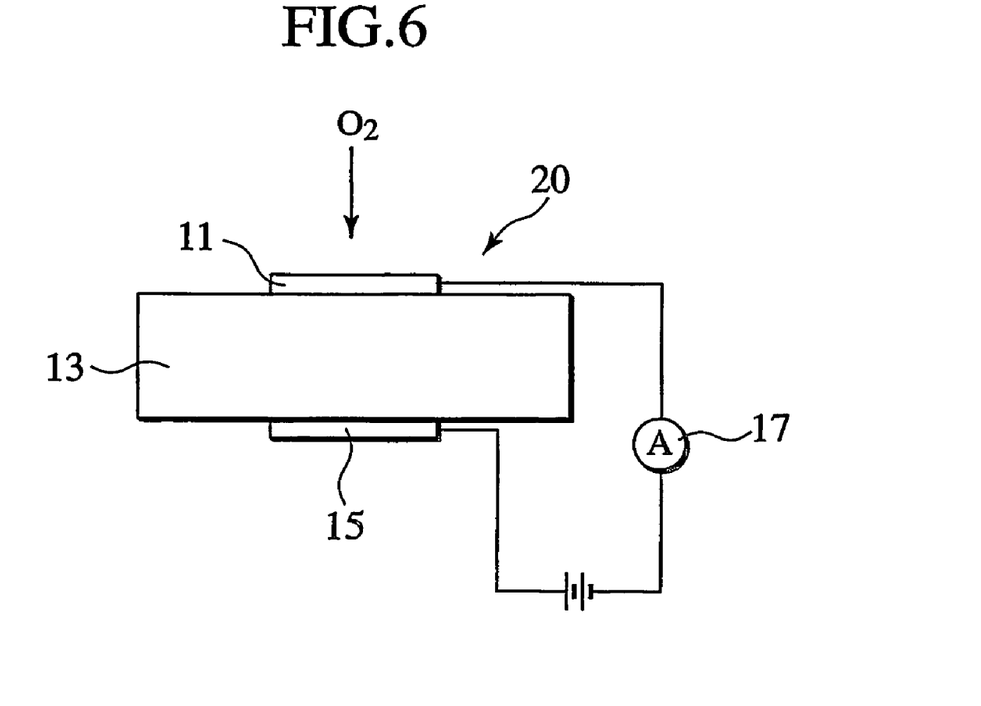
FIG. 6 is a view illustrating a schematic structure of an oxygen sensor to which the solid electrolyte of the present invention can be applied.

By the way, the solid electrolyte of the present invention represented by the presently filed embodiment set forth above can be applied to a fuel cell (unit cell) as shown in FIG. 5 and an oxygen sensor as shown in FIG. 6.

In FIG. 5, a solid electrolyte layer 3 formed of such a solid electrolyte is sandwiched between an anode 1, to which fuel gas (gas containing hydrogen) is supplied, and a cathode 5 to which air (oxygen containing gas) is supplied, thereby forming a fuel cell 10 that generates electric power using fuel and air.

In FIG. 6, the solid electrolyte layer 13 formed of such a solid electrolyte is sandwiched between a pair of electrodes 11, 15, thereby forming an oxygen sensor 20 whose electric current value, variable depending upon oxygen gas to be introduced, is detected by an ammeter 17.

In summary of the foregoing, with the method of producing solid electrolyte material according to the present invention, pressure under which sintering step of the spark plasma method is carried out is set to be equal to or less than 40 MPa while decreasing pressure to a value less than this value, e.g., a value between 10 and 15 MPa during cooling process, enabling to provide an ease of simply and beneficially obtaining a solid electrolyte, with a minimized grain diameter after sintering process with no occurrence of cracks, that is excellent in ionic conductivity.

Further, a crystal grain of the sintered product obtained by the present invention has a mean grain diameter equal to or less than 3 μm and has a favorable sintering property while enabling production of materials excellent in a conducting characteristic.

Additionally, according to the present invention, carrying out spark plasma sintering under specified conditions allows sintering time to be remarkably shortened, thereby achieving remarkable reduction in cost.

Incidentally, the solid electrolyte resulting from the producing method of the present invention can be utilized as raw materials to be applied to a solid electrolyte fuel cell, having an on-vehicle installation capability, and an oxygen concentration detection sensor for detecting exhaust gases.

The entire content of a Patent Application No. TOKUGAN 2003-078066 with a filing date of Mar. 20, 2003 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

INDUSTRIAL APPLICABILITY

As set forth above, a method of producing a solid electrolyte of the present invention is comprised of preparing solid electrolyte material with a composition formula represented by: $(1-x)\ ZrO_2+xSc_2O_3$ (where x is a number equal to or greater than 0.05 and equal to or less than 0.15) and sintering solid electrolyte material using a spark plasma method to obtain a solid electrolyte wherein the spark plasma method is carried out by applying first compression load to solid electrolyte material at pressure equal to or less than 40 MPa to sinter solid electrolyte material and obtaining sintered material which is then cooled by applying second compression load less than first compression load to sintered material, thereby producing the solid electrolyte. Such a method enables production of the solid electrolyte, which is favorable in sintering property and excellent in conducting characteristic, in a short period of time and at low cost, and thus the solid electrolyte is expected to have a wide range of applications involving a fuel cell for an on-vehicle usage and an oxygen sensor.

The invention claimed is:

1. A method of producing a solid electrolyte comprising:
preparing solid electrolyte material with a composition expressed by a formula: $(1-x)\ ZrO_2+xSc_2O_3$ (where x is a number equal to or greater than 0.05 and equal to or less than 0.15); and
sintering the solid electrolyte material to obtain a solid electrolyte using a spark plasma method, which is provided with:
sintering the solid electrolyte material to obtain sintered material while applying a first compression load to the solid electrolyte material at a level equal to or less than 40 MPa; and
cooling the sintered material to obtain the solid electrolyte while applying a second compression load, less than the first compression load, to the sintered material, wherein the second compression load has a value equal to or greater than 10 MPa and equal to or less than 15 MPa.

2. The method according to claim 1, wherein the solid electrolyte material is sintered at a temperature equal to or greater than 1000° C. and equal to or less than 1150° C. for time equal to or greater than 30 minutes and equal to or less than 180 minutes.

3. The method according to claim 1, wherein the solid electrolyte material is sintered by rising a temperature at a temperature rising speed equal to or greater than 250° C./minute.

4. The method according to claim 1, wherein after sintering the solid electrolyte material, the solid electrolyte material is cooled by dropping a temperature at a temperature drop speed equal to or less than 200° C./minute.

5. The method according to claim 1, wherein the solid electrolyte material is comprised with powder of citric acid salt.

6. The method according to claim 1, wherein the solid electrolyte material is calcined and pulverized prior to sintering.

7. The method according to claim 1, wherein the solid electrolyte material is formed in a compact while being sintered.

8. The method according to claim 1, wherein after the solid electrolyte material is sintered, heat-treatment is conducted at a temperature equal to or greater than 900° C. and equal to or less than 1000° C. for time equal to or greater than 5 hours and equal to or less than 15 hours.

9. The method according to claim 1, wherein suppose that an X-ray diffraction intensity is I, the solid electrolyte has a cubic crystal ratio, $[I(\text{cubic crystal:}220)/\{I(\text{cubic crystal:}220)+I(\beta\text{-phase:}220)\}]\times 100(\%)$, equal to or greater than 90%.

10. The method according to claim 1, wherein the solid electrolyte has a mean grain diameter equal to or less than 3 μm.

* * * * *